United States Patent
Koskela et al.

(10) Patent No.: US 11,336,357 B2
(45) Date of Patent: May 17, 2022

(54) BEAM FAILURE RECOVERY FOR SERVING CELL

(71) Applicant: NOKIA TECHNOLOGIES OY, Espoo (FI)

(72) Inventors: Timo Koskela, Oulu (FI); Samuli Heikki Turtinen, Ii (FI); Dawid Koziol, Glogow (PL)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/733,718

(22) PCT Filed: Apr. 5, 2018

(86) PCT No.: PCT/EP2018/058776
§ 371 (c)(1),
(2) Date: Oct. 2, 2020

(87) PCT Pub. No.: WO2019/192713
PCT Pub. Date: Oct. 10, 2019

(65) Prior Publication Data
US 2021/0021320 A1    Jan. 21, 2021

(51) Int. Cl.
*H04B 7/06* (2006.01)
*H04B 7/08* (2006.01)
*H04B 17/318* (2015.01)
*H04B 17/336* (2015.01)
*H04L 5/00* (2006.01)
(Continued)

(52) U.S. Cl.
CPC .......... *H04B 7/0695* (2013.01); *H04B 7/0626* (2013.01); *H04B 7/088* (2013.01); *H04B 17/318* (2015.01); *H04B 17/336* (2015.01); *H04L 5/0051* (2013.01); *H04W 16/28* (2013.01); *H04W 56/001* (2013.01); *H04W 74/02* (2013.01); *H04W 74/0833* (2013.01); *H04W 76/19* (2018.02); *H04W 80/02* (2013.01)

(58) Field of Classification Search
CPC .. H04B 7/0695; H04B 17/318; H04B 17/336; H04B 7/0626; H04B 7/088; H04W 76/19; H04W 16/28; H04W 56/001; H04W 74/02; H04W 74/0833; H04W 80/02; H04W 36/06; H04W 36/0069; H04L 5/0051
See application file for complete search history.

(56) References Cited

U.S. PATENT DOCUMENTS 11,115,835 B2 * 9/2021 Byun ................. H04W 4/40
2016/0353510 A1 * 12/2016 Zhang ................ H04B 7/0695
(Continued)

OTHER PUBLICATIONS

International Search Report and Written Opinion for International Application No. PCT/EP2018/058776, dated Dec. 3, 2018, 14 pages.
(Continued)

*Primary Examiner* — Harry H Kim
(74) *Attorney, Agent, or Firm* — Brake Hughes Bellermann LLP (57) ABSTRACT

A method includes composing, after a beam failure has been detected by a user equipment on a resource provided by a first serving cell of the user equipment, beam recovery signaling, the beam recovery signaling indicating at least one candidate beam to be used in beam failure recovery and transmitting, to a network entity, the beam recovery signaling on a resource provided by a second serving cell.

25 Claims, 3 Drawing Sheets

(51) Int. Cl.
  *H04W 16/28* (2009.01)
  *H04W 56/00* (2009.01)
  *H04W 74/02* (2009.01)
  *H04W 74/08* (2009.01)
  *H04W 76/19* (2018.01)
  *H04W 80/02* (2009.01)
  *H04W 36/06* (2009.01)
  *H04W 36/00* (2009.01)

(56) References Cited

U.S. PATENT DOCUMENTS

| | | | |
|---|---|---|---|
| 2018/0234960 A1* | 8/2018 | Nagaraja | H04W 72/046 |
| 2019/0053314 A1* | 2/2019 | Zhou | H04B 7/0695 |
| 2019/0253127 A1* | 8/2019 | Kang | H04B 7/088 |
| 2019/0274169 A1* | 9/2019 | Tsai | H04B 7/088 |
| 2020/0014440 A1* | 1/2020 | Wang | H04B 7/0408 |
| 2020/0036427 A1* | 1/2020 | Zhang | H04W 74/0833 |
| 2020/0059398 A1* | 2/2020 | Pan | H04B 7/088 |
| 2020/0322813 A1* | 10/2020 | Jia | H04W 16/28 |
| 2020/0404638 A1* | 12/2020 | Deogun | H04L 5/0091 |
| 2021/0168678 A1* | 6/2021 | Deenoo | H04W 36/305 |
| 2021/0212123 A1* | 7/2021 | Reial | H04B 7/0617 |

OTHER PUBLICATIONS

3GPP TSG RAN WG1 Meeting Ad Hoc#3, R1-1715587; "A holistic procedure for beam failure recovery" Nagoya, Japan; Sep. 18-21, 2017; 6 pages.

3GPP TSG RAN WG1 Meeting #92, R1-1802824; "Beam Recovery Procedures", Athens, Greece; Feb. 26-Mar. 2, 2018; 11 pages.

3GPP TSG RAN WG1 Meeting #92, R1-1802745; "Multi-Cell Beam Recovery", Athens, Greece; Feb. 26-Mar. 2, 2018, 5 pages.

First Examination Report for Indian Application No. 202047047193, dated Dec. 6, 2021, 6 pages.

* cited by examiner

BEAM FAILURE RECOVERY FOR SERVING CELL

CROSS-REFERENCE TO RELATED APPLICATIONS

This application is a national stage entry of International Application No. PCT/EP2018/058776, filed Apr. 5, 2018, entitled "BEAM FAILURE RECOVERY FOR SERVING CELL" which is hereby incorporated by reference in its entirety.

TECHNICAL FIELD

Various example embodiments relate to apparatuses, methods, systems, computer programs, computer program products and computer-readable media regarding beam failure recovery for serving cell.

ABBREVIATIONS AND DEFINITIONS

BFD Beam Failure Detection
BFD-RS Beam Failure Detection Reference Signal
BFRR/BFRQ Beam Failure Recovery Request
BLER Block Error Rate
C-RNTI Cell Radio Network Temporary Identifier
CBRA Contention Based Random Access
CFRA Contention Free Random Access
CSI Channel State Information
CSI RS Channel State Information Reference Signal
DMRS Demodulation Reference Signal
LCI D Logical Channel Identifier
MAC CE Medium Access Control Element
PBCH Physical broadcast channel
PCell Primary Cell
PDCCH Physical Downlink Control Channel
QCL Quasi co-location
RA-RNTI Random Access Radio Network Temporary Identifier
RAR Random Access Response
RACH Random Access Channel
RNTI Radio Network Temporary Identifier
RRC Radio Resource Control
RSRP Reference Signal Received Power
RSRQ Reference signal Received Quality
RX Reception
SCell Secondary Cell
SI NR Signal to Noise Ratio
SS Synchronization Signal
SSB Synchronization Signal Block
TCI Transmission Configuration Indication
TX Transmission
UE User Equipment

BACKGROUND

In 3GPP ($3^{rd}$ Generation Partnership Project), a beam failure recovery procedure is specified. Aim of the beam recovery is to detect when one or multiple serving control channel (PDCCH) links is/are considered to be in failure conditions and to recover the link.

According to the current definitions and descriptions in the 3GPP standard, for the mentioned scenario, the SCell uplink control channels may have to be configured on PCell, e.g. when SCell does not have corresponding uplink carrier or simply is not configured with uplink channel for control transmission. The recovery signaling cannot be made on SCell, instead the signaling has to be conveyed on PCell. In more general a specific serving cell uplink resource (PCell or SCell) can be used for recovery signaling of a failed serving cell when the recovery signaling cannot be made on the said failed serving cell. This adds configuration overhead, since the network may need to provide both Contention Free Random Access and Contention Based Random Access resource for SCell or multiple SCells, and requires the network to reserve additional uplink resources as well as spatial resources (beam directions) since network needs to monitor the potential recovery requests.

SUMMARY

It is therefore an object of various example embodiments to overcome the above-mentioned problems and to provide apparatuses, methods, systems, computer programs, computer program products and computer-readable media regarding beam failure recovery for serving cell (PCell or SCell).

According to an aspect of various example embodiments there is provided an apparatus comprising:
  means for composing, after a beam failure has been detected by a user equipment on a resource provided by a first serving cell of the user equipment, beam recovery signaling, the beam recovery signaling indicating at least one candidate beam to be used in beam failure recovery,
  means for transmitting, to a network entity, the beam recovery signaling on a resource provided by a second serving cell.

According to an aspect of various example embodiments there is provided an apparatus comprising:
  at least one processor; and
  at least one memory including computer program code, the at least one memory and computer program code configured to, with the at least one processor, cause the performance of the apparatus, as set out above.

According to an aspect of various example embodiments there is provided a method comprising:
  composing, after a beam failure has been detected by a user equipment on a resource provided by a first serving cell of the user equipment, beam recovery signaling, the beam recovery signaling indicating at least one candidate beam to be used in beam failure recovery,
  transmitting, to a network entity, the beam recovery signaling on a resource provided by a second serving cell.

According to an aspect of various example embodiments there is provided a computer program comprising instructions stored thereon for performing at least the following:
  composing, after a beam failure has been detected by a user equipment on a resource provided by a first serving cell of the user equipment, beam recovery signaling, the beam recovery signaling indicating at least one candidate beam to be used in beam failure recovery,
  transmitting, to a network entity, the beam recovery signaling on a resource provided by a second serving cell.

According to an aspect of various example embodiments there is provided a computer readable medium storing a computer program as set out above.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

Further aspects and features of the present invention are set out in the dependent claims.

BRIEF DESCRIPTION OF THE DRAWINGS

These and other objects, features, details and advantages will become more fully apparent from the following detailed description of various aspects/embodiments which is to be taken in conjunction with the appended drawings, in which.

DETAILED DESCRIPTION

The present disclosure is described herein with reference to particular non-limiting examples and to what are presently considered to be conceivable embodiments. A person skilled in the art will appreciate that the present disclosure is by no means limited to these examples and embodiments, and may be more broadly applied.

In the following, some example versions of the disclosure and embodiments are described with reference to the drawings. For illustrating the various embodiments, the examples and embodiments will be described in connection with a cellular communication network based on a 3GPP based communication system, for example an LTE/LTE-A based system, a 5G/NR system or the like. As such, the description of example embodiments given herein specifically refers to terminology which is directly related thereto. Such terminology is only used in the context of the presented non-limiting examples and embodiments, and does naturally not limit the present disclosure in any way. Rather, any other system configuration or deployment may equally be utilized as long as complying with what is described herein and/or example embodiments described herein are applicable to it. Further, it is to be noted that the various embodiments are not limited to an application using such types of communication systems or communication networks, but is also applicable in other types of communication systems or communication networks.

In 3GPP, a beam failure recovery procedure is specified. Beam recovery may be also referred to as link reconfiguration. Aim of the beam recovery is to detect when one or multiple serving control channel (PDCCH) links is/are considered to be in failure conditions and to recover the link. To recover the link, UE initiates signaling toward the network to indicate the failure and new potential links (beams) called candidate link (beam). As a response to the beam failure recovery request received from the UE, the network may configure the UE with a new PDCCH link.

Beam Failure Detection Reference Signal

The network configures the UE with a set of reference signals for monitoring the quality of the link. This set may be referred as set of q0 or set of beam failure detection reference signals (RS) or beam failure detection reference signals (BFD-RS). Typically, BFD-RS(s) are configured to be spatially quasi co-located (QCL'd) with PDCCH DMRS i.e. these reference signals correspond to downlink beams used to transmit PDCCH for the UE. Downlink Beams are identified by a reference signal, either SS/PBCH block index (time location index) or CSI-RS resource index, thus the BFD-RS (or set of q0) is a list of SS/PBCH block and/or CSI-RS resources. The network may explicitly configure the BFD-RS list using RRC signaling or it may be possible to define a way to use combined RRC+MAC CE signaling where the MAC CE can be used to activate a set or a subset of RRC configured resources as BFD-RS.

When the UE is not explicitly configured with a BFD-RS list, it determines the BFD-RS resources implicitly based on the configured/indicated/activated PDCCH-TCI states per CORESET i.e. the downlink reference signals (CSI-RS, SS/PBCH block) that are spatially QCL'd with PDCCH DMRS, or in other words, PDCCH beams. Typically, only activated TCI states (used by the UE for monitoring PDCCH) are considered for failure detection but it is not excluded by various example embodiments of this invention to determine failure based on all the TCI states for PDCCH.

Declaring Beam Failure

The physical layer assesses the quality of the radio link (based on BFD-RS in set of q0) periodically. The assessment is done per BFD-RS and when the radio link condition of each BFD-RS in the beam failure detection set is considered to be in failure condition i.e. the hypothetical PDCCH BLER estimated using the RS is above the configured threshold, a beam failure instance (BFI) indication is provided to higher protocol layer (MAC). One example of BLER threshold value may be the out of sync threshold used for radio link monitoring OOS/Qout=10%. Evaluation and indication is done periodically. In case the at least one BFD-RS is not in failure condition, no indication is provided to higher layer.

MAC layer implements a counter to count the BFI indications from the PHY layer and if the BFI counter reaches maximum value (configured by the network) a beam failure is declared/detected. This counter can be configured to be supervised by a timer, which is started each time MAC receives BFI indication from lower layer. Once the timer expires, the BFI counter is reset (counter value is set to zero). Alternatively or additionally, a timer may also be also configured to supervise the beam failure recovery procedure. The timer may be started upon detecting beam failure, and, when the timer expires, the UE declares the beam failure recovery to be unsuccessful. While the timer is running, the UE may try to recover the link.

Candidate Reference Signal (Beam) List

The network may provide the UE with a list of candidate RSs for recovery that can be indicated using dedicated signal. Candidate beam L1-RSRP measurements may be provided to MAC layer which performs the selection of new candidate and determines the uplink resources to indicate the new candidate to the network. The network may configure the UE with dedicated signaling resources (set of PRACH resources) that are candidate beam specific, i.e. the UE can indicate a new candidate by sending a preamble.

Beam Failure Recovery Request

A beam failure recovery procedure is initiated if the UE has declared/detected a beam failure and the UE has detected new candidate beam or beams based on L1 measurements (e.g. L1-RSRP). A dedicated signal (e.g. from the PRACH preamble signal resource set or a separate preamble resource configuration), which can be referred to as BFR resource or CFRA resources for beam failure recovery, is used to indicate a candidate RS from the Candidate-Beam-RS-List (can be referred also as set of resources in set q1). It has to be noted that beam recovery procedure using CFRA-BFR resources differs slightly from Random Access (RA) procedure in terms of how gNB response is provided to the UE. A specific threshold may also be configured so that any of the new candidates (based on L1-RSRP measurements) is only indicated in case it is above the threshold. The UE selects a candidate beam from that set and in case there are no beams above the configured threshold, UE utilizes contention based signaling to indicate new candidate (CBRA preamble resources are mapped to specific downlink RS e.g. SS/PBCH block or CSI-RS). This threshold may be configured as RSRP threshold. Other thresholds such as RSRQ, SI NR, BLER are not excluded in various example embodiments of this invention.

The UE monitors the network response to BFRR (or BFRQ) during the Beam recovery response window (similar to RAR window) using the same beam alignment as used for transmitting the recovery signal (i.e. the same beam direction which was used for TX is used for RX). Subsequently, it expects the network to provide response using a beam that is spatially QCL'd with the indicated downlink reference signal. A case where this correspondence does not hold is not yet defined.

In case of contention free signaling used for beam recovery purposes, the UE expects the network to respond to the UE using C-RNTI instead of RA-RNTI when CFRA procedure is used. In case CBRA resources are used, the UE expects the response as normally in RA procedure.

The beam failure recovery (BFR) or link reconfiguration procedure does not differentiate between PCell and SCell (in carrier aggregation scenario) and can be applied to any serving cell. This applies to a case where the SCell has also a corresponding uplink carrier. If the UE has a corresponding UL carrier with Contention Based RACH configuration, the BFR/link reconfiguration procedures may be applied directly.

BFD-RS configuration options consider scenarios where spatial QCL is assumed and where there is no spatial QCL assumption of reference signals for beam failure detection (CSI-RS, SS/PBCH block) across the carriers. For example, if the first serving cell failure is determined on first set of BFD-RS and second serving cell failure is determined on a second set and the failure detection RS set do not overlap, it is possible that only one serving cell is in failure condition.

In a first case, the cross carrier spatial QCL of BFD-RS is valid for PCell and Scell(s), the beam failure can be detected on BFD-RS resources (CSI-RS, SS/PBCH block) of PCell and it implicitly means that all the SCell (or multiple SCells or in more general terms, serving cells) are in the beam failure condition due to spatial QCL assumption of the reference signals used for assessing the link quality.

On the other hand, in a second case, the spatial QCL assumption for BFD-RS does not hold across the carriers, the UE needs to be able to detect beam failure and perform recovery for each serving cell separately.

The scenario according to the second case may occur e.g. when PCell is located in FR1 (Frequency Range 1, i.e. below 6 GHz) and SCell is configured to be downlink only on FR2 (above 6 GHz). Alternatively, both PCell (this may refer to PSCell in case of dual connectivity) and SCell may operate on the same FR but due to the PDCCH TCI configuration (which is cell specific), the BFD-RS detection resources may be different i.e. there may not be correspondence between PCell and SCell failure. The latter may happen in particular in case a cell with multiple Transmission/Reception Points (TRPs) is deployed.

According to certain embodiments of the present invention, the scenario of interest is when the SCell has no corresponding uplink (i.e. no PUSCH or PUCCH) or the SCell has no RACH configuration, which makes it impossible to reuse currently defined BFR procedure. In this case, the SCell uplink control channels are configured on PCell. In context of beam failure recovery, since the recovery signaling (i.e. indication of new candidate or set Qnew) cannot be made on SCell, the signaling has to be conveyed on PCell. This adds configuration overhead (network may need to provide CFRA resource or both CFRA and CBRA resources for SCell) and requires the network to reserve additional uplink resources as well as spatial resources (beam directions) since the network needs to monitor the potential recovery requests. In some cases, SCell may have uplink and CFRA signaling resources can be configured, e.g. for beam recovery purposes, but it may not have configuration for contention based RACH resources. In this case, the CBRA resources of another serving cell (PCell or SCell) may be used. CBRA resources may also be used to request UL resources for transmitting indication of beam failure and new candidates, if available.

To avoid the above mentioned overhead of reserving preambles on PCell uplink resources for (each) SCell, according to various example embodiments, a MAC CE based solution to indicate beam failure of a SCell is proposed.

According to various example embodiments related to the use of CFRA signaling of SCell candidates on PCell or using CFRA signaling to indicate candidates on (a failed) SCell, configuring CFRA signals for large set of potential candidate beams is not feasible due to the resource configuration overhead. Since the dedicated signals are UE specific, the amount of resources that need to be configured increases linearly with the number of UEs and adds uplink overhead. Already for PCell beam failure recovery, the dedicated resources increase uplink overhead. Adding SCell specific signaling adds additional overhead on top of that. Besides, if the network would need to reserve preambles from the PCell for SCell, each preamble set for SCell should be allocated from each beam in the PCell which may make a preamble solution infeasible in practice if not complemented with alternative signaling options. Similarly, as for PCell, it is not feasible to configure dedicated signals for each potential SCell candidate beam, especially in case when these signaling resources are configured on PCell uplink. Providing CFRA resources for subset of candidates may opportunistically speed up the recovery process but relying only on CFRA based solution for SCell recovery is not feasible. In one aspect, if the UE cannot indicate any new candidate using CFRA signaling but new candidates still exist, alternative signaling mechanisms should be available.

Furthermore, in PCell BFR, it has been specified to use of CBRA to complement the use of CFRA signaling, thus similar solution should be used for SCell BFR. In case SCell is downlink only (i.e. no RA resources available) the SR/CBRA resource are only available on PCell (when PCell is not in failure condition). However, the SR/CBRA in the PCell cannot indicate any candidate beam in SCell directly as the preamble defines only the beam in PCell. In consequence, a preamble based solution alone is not enough to support efficient SCell beam failure recovery.

According to various example embodiments, there are proposed efficient signaling mechanisms and set of rules of how to indicate SCell beam failure and candidate links/beams when UE can identify those on a SCell.

Thus, the various example embodiments relate to a beam failure recovery procedure for a serving cell (PCell or SCell), when the serving cell has no corresponding uplink. Instead of the Contention Free Random Access procedure, a MAC CE based Beam Failure Recovery solution is used in various example embodiments.

Also, the various example embodiments relate to a beam failure recovery procedure for SCells, when the SCell has configuration of CFRA resources to indicate new candidate beams (either on PCell or SCell) but may not be able to indicate alternative candidates using preamble based signaling in case the CFRA resources are not available or are not considered to be suitable.

In case of a beam failure on a first serving cell (e.g., SCell), the UE transmits the serving cell beam recovery signaling on a second serving cell (e.g., PCell) using MAC CE and includes first serving cell (e.g. SCell) information. The NW configures UE with candidate beam threshold(s) (L1-RSRP, RSRQ, SINR, hyp. PDCCH BLER or alike). When at least one candidate beam is above the configured threshold, the UE includes in a MAC CE all (or N-highest quality beams based on measurement quantity such as RSRP) the candidate beams information above the threshold. If no candidates are above the threshold, the UE includes only one candidate in the new MAC CE, e.g. the one with the strongest L1-RSRP, RSRQ, SINR etc. Then, the final selection is done by the network, out of the candidate set signaled by the UE.

In other various example embodiments, if no candidates are above the threshold, the UE sends the new MAC CE without indicating any beam.

In the following, a detailed example of certain embodiments of the present invention will be described. However, it is noted that the present disclosure is not limited to the detailed example described herein.

When beam failure has been declared/detected on a first serving cell (e.g., an SCell) (but a second serving cell (e.g., PCell) is not in failure condition) and new candidate beams exists on the failed first serving cell (e.g., SCell), the UE transmits the first serving cell (e.g., SCell) beam recovery signaling on the second serving cell (e.g., PCell) using MAC CE and includes first serving cell (e.g., SCell) candidate beam information. It may also be indicated in a MAC CE which first serving cell (e.g., SCell) was in failure. Without the loss of generality in this invention, PCell and SCell are discussed. However, it is possible to refer only to serving cells and assume that e.g. when PCell has failed and SCell can be used for recovery of PCell, it may be used in similar manner as in case of SCell failure and PCell recovery.

The NW may configure the UE with candidate beam threshold(s). In this regard, possibly different thresholds are configured to be used for CSI-RS and SSB based beams.

According to various example embodiments, the UE determines the quality level of downlink RS (can be referred to as candidate beam) associated with contention free preambles for SCell beam failure recovery:
If the quality of a candidate beam or beams is above the configured first threshold (threshold-candidate-CFRA, or q1_scell_cfra), UE selects the candidate beam from that set and indicates to network using CFRA transmission. In one example, the UE may select randomly for the set above the threshold, or select highest. The CFRA preambles may be mapped either to PCell or SCell uplink.

If no candidate beam is above the first quality threshold, UE selects at most N-highest quality candidate beams to be included in the SCell BFR MAC CE. UE may also be configured to indicate that no candidates are available if no candidates are above the first threshold. Alternatively, or additionally UE may use methods described in this application to select the candidates to be included in the MAC CE.

In various dependent embodiments, the candidates beams to be included in the SCell BFR MAC CE need to be also above second threshold (threshold_SCell_candidate). If no candidates are above the second threshold, UE selects the highest quality candidate to be included or select among the set of detected candidates and report N-highest. UE may also be configured to indicate that no candidates are available if no candidates are above the second threshold.

According to various example embodiments, the UE determines the quality level of downlink RS (can be referred to as candidate beam) associated with contention free preambles for SCell beam failure recovery:
If the highest quality candidate beam that can be indicated using CFRA (candidate-CFRA) is higher than the configured first threshold (threshold-candidate-CFRA, or q1_scell_cfra) and highest quality candidate that is not associated with CFRA preamble is equal or higher than candidate-CFRA+offset:
The CFRA is not used for indicating candidates and UE selects N-highest or the set of candidates that are equal or higher than candidate-CFRA_highest (highest candidate based on signal quality)+offset.

Offset may be on either log scale (dB) or in linear scale (Watts)

If no candidate beam is above the quality threshold, UE selects at most N-highest quality candidate beams to be included in the SCell BFR MAC CE. Provided UL grant may limit the number of reported candidates.

According to various example embodiments, if the UE has not been configured with CFRA preambles, the UE determines the quality level of downlink RS (can be referred to as candidate beam):
UE selects MAC CE reporting and includes N-highest quality candidate beams that are above a configured threshold (threshold_SCell_candidate) or selects N-highest based on the signal quality of all detected SCell beams.

According to various example embodiments, the UE may also be configured explicitly with following reporting configurations when using SCell BFR MAC CE:
Only SSB candidates
Only CSI-RS candidates
CSI-RS candidates above the threshold (e.g. RSRP), if none above the threshold, report only SSBs
Both SSB and CSI-RS candidates
At least one SSB and at least one CSI-RS if above (threshold_SCell_candidate)

According to various example embodiments, the UE determines the quality level of downlink RS (can be referred to as candidate beam) associated with contention free preambles for SCell beam failure recovery:
If multiple candidates that can be indicated using CFRA signaling are above the configured first threshold, the UE determines to include the candidate beams (e.g. N-highest) to a MAC CE instead of initiating CFRA signaling procedure for SCell beam failure recovery In various embodiments, signal quality level and the threshold level(s) may be determined and defined based on/as RSRP (L1-RSRP), RSRQ, SINR, hypothetical PDCCH BLER or the like.

In various embodiments, the CFRA preambles configured for SCell beam failure recovery may be configured on SCell (or one of the SCells with uplink) or on PCell.

In various example embodiments, when the UE has been configured with a candidate beam threshold TH1 (L1-RSRP, RSRQ, SINR, hyp. PDCCH BLER or alike) and there is at least one candidate beam (downlink RS, CSI-RS/SS block) above the threshold, the UE includes in a MAC CE (SCell BFRR/BFR MAC CE) all the candidate beams information above the threshold TH1 up to N-best (configured by NW) or limited by the available uplink grant.

If no candidates are above the configured threshold TH1, UE includes only one candidate in the new MAC CE (e.g. the one with the strongest L1-RSRP, RSRQ, SI NR etc.). This threshold may be the same or different as the candidate beam threshold for determining when to use CFRA signaling i.e. the same threshold may be re-interpreted for MAC CE candidate selection when UE has determined to use MAC CE for recovery. That is, according to various embodiments, using the first threshold (candidate threshold), the UE evaluates whether to use CFRA or not (this is a limited set of candidates). Then, the UE determines, using the second threshold to determine what to include in the MAC CE e.g. if there are multiple candidates above the threshold, indicate those, if there is no candidate above the threshold above, indicate one.

In various example embodiments, when the UE reports N-highest (or one) RSRPs, it prioritizes CSI-RS candidates over SSB candidates (taking into account potential power offset between CSI-RS and SSB) as long as the CSI-RS candidate quality level CSI-RS-RSRP>=Offset_1+ SSB_RSRP, where offset_1 may be negative, zero or positive. Other means to define power offset are not excluded as long as the signal quality between SSB and CSI-RS can be compared for reporting purposes.

Further, it is noted that it may be beneficial to prioritize CSI-RS candidates (up to a certain point), since the CSI-RS beams may already be so-called "refined beams" i.e. network may use narrower/higher beam pattern to transmit CSI-RS.

In various example embodiments, if the indicated candidate or candidates are above the configured threshold TH1, the reporting quantity (e.g. RSRP) is omitted from the MAC CE. In such a case, the order of the candidates in the report defines the quality level of the beams (e.g., the strongest beam is indicated first and then the second strongest and so on). As the threshold is configured by the NW, it will know that the beams are at least as good as defined by the threshold.

Alternatively, in case only one candidate is reported (above or below threshold) the measurement quantity is omitted. This may be signaled using separate MAC CE with different LCID, or implicitly by setting length field value so that only resource index (SSB, CSI-RS) is indicated. Further, a one-bit indication may be used in this case to indicate whether reported resource is above or below the configured threshold In various example embodiments, in case the UE cannot detect any new candidates on SCell, it sets the SCell BFRR MAC CE length field to zero value (L='0') and sends it through PCell.

This indicates to the NW that there is no candidate detected in the failed SCell and the NW may take an action, e.g., deactivate the SCell or remove its configuration.

Alternatively, in case the UE is configured with multiple SCells, MAC CE can be non-zero length, but would include only an index(es) of the failed SCell(s).

In various example embodiments, the SCell candidate threshold (TH1) may be determined by the highest PCell L1-RSRP value of current active BFD-RS(s) and/or PDCCH TCI state(s), or as a relative value.

Thus, according to various example embodiments, in case of a beam failure on SCell, but when PCell is not in failure condition, and new candidate beams exists on the failed SCell, UE transmits the SCell beam recovery signaling on PCell using MAC CE;

NW configures UE with candidate beam threshold(s) (L1-RSRP, RSRQ, SI NR, hyp. PDCCH BLER or alike);

When the UE has been configured with candidate beam threshold TH1 and at least one candidate beam is above the threshold, UE includes in a MAC CE all the candidate beams information above the threshold (or up to N candidates according to network configuration);

If no candidates are above the threshold, UE includes only one candidate in the new MAC CE, e.g. the one with the strongest L1-RSRP, RSRQ, SI NR etc.

Further, according to various example embodiments:
1. the UE reports N-highest/up to N-highest RSRPs, it prioritizes CSI-RS candidates over SSB candidates as long as the CSI-RS candidate quality level CSI-RS-RSRP>=Offset_1+SSB_RSRP, where offset_1 may be negative, zero or positive;
2. if the indicated candidate or candidates are above the configured threshold TH1, the order of the candidates in the report defines the quality level of the beams;
3. in case only one candidate is reported the measurement quantity is omitted. A one-bit indication may be used in this case to indicate whether reported resource is above or below the configured threshold.

According to various example embodiments, it is possible to support beam failure on SCells, which are not configured with uplink resources. This is a likely scenario as in mobile networks there is still high asymmetry between uplink and downlink data throughput requirements from the UEs. Furthermore, the proposed method according to various example embodiments does not require the network to reserve large amount of uplink resources for the sake of supporting BFR procedure on SCells. It has to be noted that even for the sake of supporting BFR on PCell, the network has to either enlarge RACH resource pool (meaning less resources for data scheduling) or decrease RACH resource pool used for handover (HO), which would cause deteriorated HO performance.

According to various example embodiments, it is possible to support beam failure recovery on SCells, even if no uplink resources are configured, and to avoid the reservation of large amount of uplink resources for the sake of supporting BFR procedure on SCells.

In the following, a more general description of example versions of the present invention is made with respect to FIGS. 1 to 3.

Figure 1:
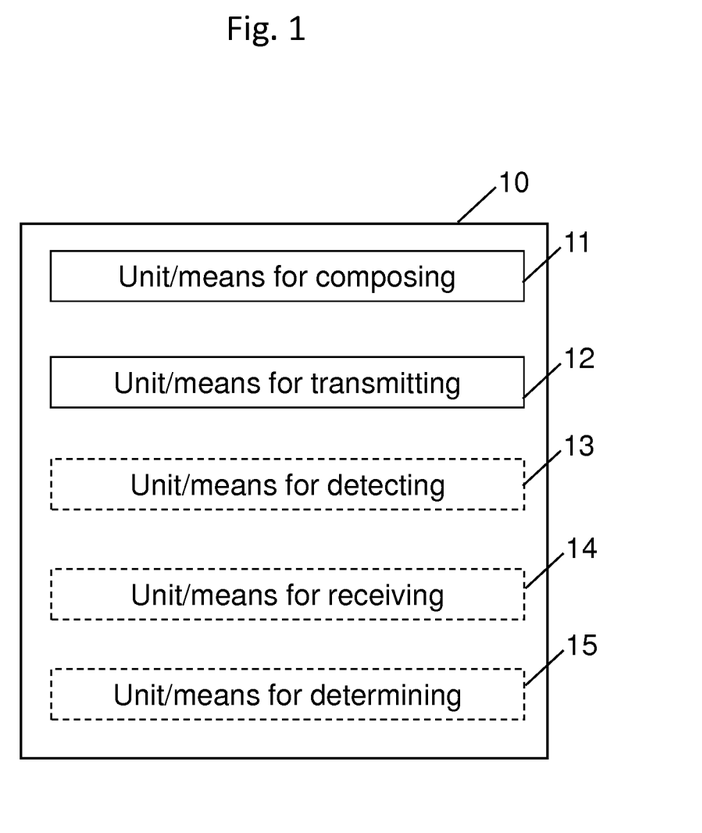
FIG. 1 is a block diagram illustrating an example of an apparatus according to certain aspects of the present invention.

FIG. 1 is a block diagram illustrating an example of an apparatus according to some example versions of the present invention. According to example versions of the present invention, the apparatus may be implemented in or may be part of a user equipment in a mobile communication network, or the like.

The apparatus 10 comprises means for composing 11, after a beam failure has been detected by a user equipment on a resource provided by a first serving cell of the user equipment, beam recovery signaling, the beam recovery signaling indicating at least one candidate beam to be used in beam failure recovery, and means for transmitting 12, to a network entity, the beam recovery signaling on a resource provided by a second serving cell.

According to various example embodiments of the invention, the apparatus optionally further comprises means for detecting 13 at least one candidate beam existing on the resource provided by the first serving cell, means for receiving 14, from the network entity, a first quality threshold for a candidate beam to be used for the beam failure recovery, means for determining 15 whether a quality value of the at least one candidate beam for the beam failure recovery exceeds the first quality threshold.

According to various example embodiments of the invention, if it is determined that there is at least one candidate beam associated with contention free random access, CFRA, signal and having a quality value exceeding the first quality threshold, the beam recovery signaling is transmitted to the network entity using contention free random access transmission and includes a predetermined number of the at least one or more of the plurality of candidate beams having a quality value exceeding the first quality threshold in descending order of the quality value.

According to various example embodiments of the invention, the means for receiving 14 is further configured to receive, from a network entity, a second threshold value for a candidate beam to be used for the beam failure recovery, and the means for determining 15 is further configured to determine whether a quality value of the at least one candidate beam for the beam failure recovery exceeds the second quality threshold.

According to various example embodiments of the invention, if it is determined that there is no candidate beam having a quality value exceeding the first quality threshold and that there is at least one candidate beam having a quality value exceeding the first or second quality threshold, the beam recovery signaling is transmitted to the network entity using a medium access control element, MAC CE, and includes a predetermined number of the at least one or more of the plurality of candidate beams having a quality value exceeding the second quality threshold in descending order of the quality value.

According to various example embodiments of the invention, the beam recovery signaling further including information on the quality value of each candidate beam.

According to various example embodiments of the invention, if it is determined that there is no candidate beam having a quality value exceeding the first and second quality threshold, the beam recovery signaling is transmitted using a medium access control element, MAC CE, and includes information on one candidate beam having the highest quality value among the detected candidate beams.

According to various example embodiments of the invention, if it is determined that there is no candidate beam having a quality value exceeding the first and second quality threshold, the user equipment indicates to the network entity that no candidate is available.

According to various example embodiments of the invention, if it is determined that there is one candidate beam existing on the first serving cell, the beam recovery signaling includes the one candidate beam, wherein the beam recovery signaling optionally includes information whether or not the candidate beam exceeds the first and second quality threshold, and the quality value of the candidate beam is optionally signaled in a separate transmission to the network entity.

According to various example embodiments of the invention, a candidate beam having a quality value indicated by a channel state information reference signal, CSI-RS, is prioritized over a candidate beam having a quality value indicated by a synchronization signal block, SSB, if the quality value indicated by the CSI-RS is equal to or higher that the quality value indicated by the SSB including a predetermined offset value.

According to various example embodiments of the invention, the quality value is one of reference signal received power, RSRP, reference signal received quality, RSRQ, and signal-to-noise ratio, SINR.

Figure 2:
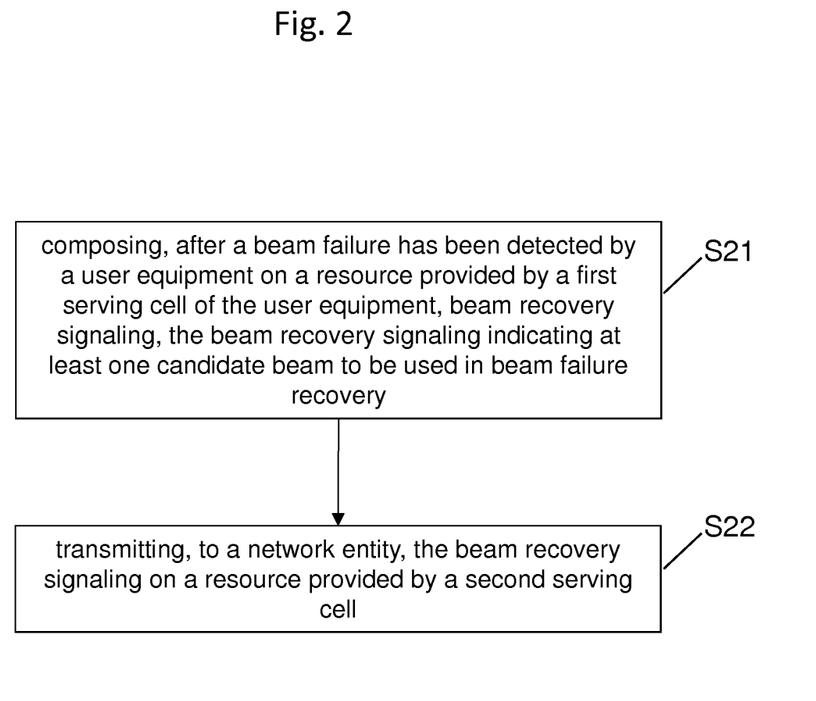
FIG. 2 is a flowchart illustrating an example of a method according to certain aspects of the present invention

FIG. 2 is a flowchart illustrating a method according to various example embodiments of the present invention. The apparatus according to FIG. 1 may perform the method of FIG. 2 but is not limited to this method. The method of FIG. 2 may be performed by the apparatus of FIG. 1 but is not limited to being performed by this apparatus.

According to example versions of the present invention, the method may be implemented in or may be part of a user equipment in a mobile communication network, or the like. The method comprises composing, after a beam failure has been detected by a user equipment on a resource provided by a first serving cell of the user equipment, beam recovery signaling, the beam recovery signaling indicating at least one candidate beam to be used in beam failure recovery, and transmitting, to a network entity, the beam recovery signaling on a resource provided by a second serving cell.

According to various example embodiments of the invention, the method optionally further comprises detecting at least one candidate beam existing on the resource provided by the first serving cell, receiving, from the network entity, a first quality threshold for a candidate beam to be used for the beam failure recovery, and determining whether a quality value of the at least one candidate beam for the beam failure recovery exceeds the first quality threshold.

According to various example embodiments of the invention, if it is determined that there is at least one candidate beam associated with contention free random access, CFRA, signal and having a quality value exceeding the first quality threshold, the beam recovery signaling is transmitted to the network entity using contention free random access transmission and includes a predetermined number of the at least one or more of the plurality of candidate beams having a quality value exceeding the first quality threshold in descending order of the quality value.

According to various example embodiments of the invention, the method further comprises receiving, from the network entity, a second threshold value for a candidate beam to be used for the beam failure recovery, and determining whether a quality value of the at least one candidate beam for the beam failure recovery exceeds the second quality threshold.

According to various example embodiments of the invention, if it is determined that there is no candidate beam having a quality value exceeding the first quality threshold and that there is at least one candidate beam having a quality value exceeding the first or second quality threshold, the beam recovery signaling is transmitted to the network entity using a medium access control element, MAC CE, and includes a predetermined number of the at least one or more of the plurality of candidate beams having a quality value exceeding the second quality threshold in descending order of the quality value.

According to various example embodiments of the invention, the beam recovery signaling may further include information on the quality value of each candidate beam.

According to various example embodiments of the invention, if it is determined that there is no candidate beam having a quality value exceeding the first and second quality threshold, the beam recovery signaling is transmitted using a medium access control element, MAC CE, and includes information on one candidate beam having the highest quality value among the detected candidate beams.

According to various example embodiments of the invention, if it is determined that there is no candidate beam having a quality value exceeding the first and second quality threshold, the user equipment indicates to the network entity that no candidate is available According to various example embodiments of the invention, if it is determined that there is one candidate beam existing on the first serving cell, the beam recovery signaling includes the one candidate beam, wherein the beam recovery signaling optionally includes information whether or not the candidate beam exceeds the first and second quality threshold, and the quality value of the candidate beam is optionally signaled in a separate transmission to the network entity.

According to various example embodiments of the invention, a candidate beam having a quality value indicated by a channel state information reference signal, CSI-RS, is prioritized over a candidate beam having a quality value indicated by a synchronization signal block, SSB, if the quality value indicated by the CSI-RS is equal to or higher that the quality value indicated by the SSB including a predetermined offset value.

According to various example embodiments of the invention, the quality value is one of reference signal received power, RSRP, reference signal received quality, RSRQ, and signal-to-noise ratio, SINR.

Figure 3:
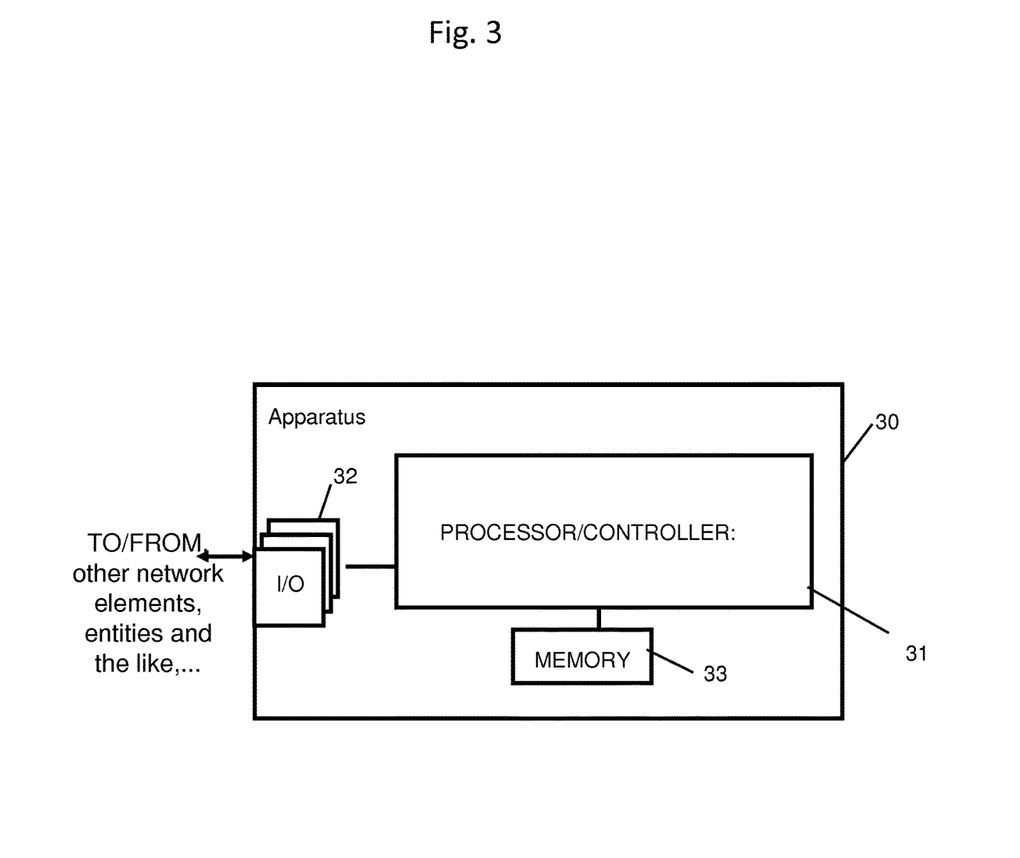
FIG. 3 is block diagram illustrating another example of an apparatus according to certain aspects of the present invention.

FIG. 3 is a block diagram illustrating another example of an apparatus according to some example versions of the present invention.

In FIG. 3, a block circuit diagram illustrating a configuration of an apparatus 30 is shown, which is configured to implement the above described various aspects of the invention. It is to be noted that the apparatus 30 shown in FIG. 3 may comprise several further elements or functions besides those described herein below, which are omitted herein for the sake of simplicity as they are not essential for understanding the invention. Furthermore, the apparatus may be also another device having a similar function, such as a chipset, a chip, a module etc., which can also be part of an apparatus or attached as a separate element to the apparatus, or the like.

The apparatus 30 may comprise a processing function or processor 31, such as a CPU or the like, which executes instructions given by programs or the like. The processor 31 may comprise one or more processing portions dedicated to specific processing as described below, or the processing may be run in a single processor. Portions for executing such specific processing may be also provided as discrete elements or within one or further processors or processing portions, such as in one physical processor like a CPU or in several physical entities, for example. Reference sign 32 denotes transceiver or input/output (I/O) units (interfaces) connected to the processor 31. The I/O units 32 may be used for communicating with one or more other network elements, entities, terminals or the like. The I/O units 32 may be a combined unit comprising communication equipment towards several network elements, or may comprise a distributed structure with a plurality of different interfaces for different network elements. The apparatus 30 further comprises at least one memory 33 usable, for example, for storing data and programs to be executed by the processor 31 and/or as a working storage of the processor 31.

The processor 31 is configured to execute processing related to the above described aspects.

In particular, the apparatus 30 may be implemented in or may be part of a user equipment or the like, and may be configured to perform processing as described in connection with FIGS. 1 and 2.

In the foregoing exemplary description of the apparatus, only the units/means that are relevant for understanding the principles of the invention have been described using functional blocks. The apparatus may comprise further units/ means that are necessary for its respective operation, respectively. However, a description of these units/means is omitted in this specification. The arrangement of the functional blocks of the apparatus is not to be construed to limit the invention, and the functions may be performed by one block or further split into sub-blocks.

When in the foregoing description it is stated that the apparatus (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is to be construed to be equivalent to an expression such as "means for").

For the purpose of the present invention as described herein above, it should be noted that method steps likely to be implemented as software code portions and being run using a processor at an apparatus (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the aspects/embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the aspects/embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components, APU (Accelerated Processor Unit), GPU (Graphics Processor Unit) or DSP (Digital Signal Processor) components;

devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is to be noted that the aspects/embodiments and general and specific examples described above are provided for illustrative purposes only and are in no way intended that the present invention is restricted thereto. Rather, it is the intention that all variations and modifications which fall within the scope of the appended claims are covered.

The invention claimed is:

1. An apparatus, comprising:
   at least one processor, and
   at least one memory including computer program code,
   the at least one memory and the computer program code configured to, with the at least one processor, cause the apparatus at least to:
   compose, after a beam failure has been detected by a user equipment on a resource provided by a first serving cell of the user equipment, beam recovery signaling, the beam recovery signaling indicating at least one candidate beam to be used in beam failure recovery, and
   transmit, to a network entity, the beam recovery signaling on a resource provided by a second serving cell,
   wherein a candidate beam having a quality value indicated by a channel state information reference signal, CSI-RS, is prioritized over a candidate beam having a quality value indicated by a synchronization signal block, SSB, if the quality value indicated by the CSI-RS is equal to or higher than the quality value indicated by the SSB including a predetermined offset value.

2. The apparatus according to claim 1, wherein the at least one memory and computer program code are further configured, with the at least one processor, to cause the apparatus to:
   detect at least one candidate beam existing on the resource provided by the first serving cell,
   receive, from the network entity, a first quality threshold for a candidate beam to be used for the beam failure recovery, and
   determine whether a quality value of the at least one candidate beam for the beam failure recovery exceeds the first quality threshold.

3. The apparatus according to claim 2, wherein:
   if it is determined that there is at least one candidate beam associated with contention free random access, CFRA, signal and having a quality value exceeding the first quality threshold,
   the at least one memory and computer program code are configured, with the at least one processor, to cause the apparatus to transmit the beam recovery signaling to the network entity using contention free random access transmission to indicate at least one of candidates having quality value exceeding the first quality threshold.

4. The apparatus according to claim 3, wherein:
   the beam recovery signaling further includes information on the quality value of each candidate beam.

5. The apparatus according to claim 2, wherein the at least one memory and computer program code are further configured, with the at least one processor, to cause the apparatus to:
   receive, from the network entity, a second threshold value for a candidate beam to be used for the beam failure recovery, and
   determine whether a quality value of the at least one candidate beam for the beam failure recovery exceeds the second quality threshold.

6. The apparatus according to claim 5, wherein:
   if it is determined that there is no candidate beam associated with CFRA signal having a quality value exceeding the first quality threshold and that there is at least one candidate beam having a quality value exceeding the first or second quality threshold,
   the beam recovery signaling is transmitted to the network entity using a medium access control element, MAC CE, and includes a predetermined number of the at least one or more of the plurality of candidate beams having a quality value exceeding the second quality threshold in descending order of the quality value.

7. The apparatus according to claim 5, wherein:
   if it is determined that there is no candidate beam having a quality value exceeding the first and second quality threshold,
   the beam recovery signaling in the MAC CE includes information on one candidate beam having the highest quality value among the detected candidate beams.

8. The apparatus according to claim 5, wherein:
if it is determined that there is no candidate beam having a quality value exceeding the first and second quality threshold,
the user equipment indicates to the network entity that no candidate is available.

9. The apparatus according to claim 5, wherein:
if it is determined that there is one candidate beam existing on the first serving cell,
the beam recovery signaling includes the one candidate beam, wherein
the beam recovery signaling optionally includes information whether or not the candidate beam exceeds the first and second quality threshold, and
the quality value of the candidate beam is optionally signaled in a separate transmission to the network entity.

10. The apparatus according to claim 2, wherein:
the quality value and/or the threshold value is one of reference signal received power, RSRP, reference signal received quality, RSRQ, and signal-to-noise ratio, SINK.

11. A method, comprising:
composing, after a beam failure has been detected by a user equipment on a resource provided by a first serving cell of the user equipment, beam recovery signaling, the beam recovery signaling indicating at least one candidate beam to be used in beam failure recovery, and
transmitting, to a network entity, the beam recovery signaling on a resource provided by a second serving cell
wherein a candidate beam having a quality value indicated by a channel state information reference signal, CSI-RS, is prioritized over a candidate beam having a quality value indicated by a synchronization signal block, SSB, if the quality value indicated by the CSI-RS is equal to or higher than the quality value indicated by the SSB including a predetermined offset value.

12. The method according to claim 11, further comprising:
detecting at least one candidate beam existing on the resource provided by the first serving cell,
receiving, from the network entity, a first quality threshold for a candidate beam to be used for the beam failure recovery, and
determining whether a quality value of the at least one candidate beam for the beam failure recovery exceeds the first quality threshold.

13. The method according to claim 12, wherein:
if it is determined that there is at least one candidate beam associated with contention free random access, CFRA, signal and having a quality value exceeding the first quality threshold,
the beam recovery signaling is transmitted to the network entity using contention free random access transmission to indicate at least one of candidates having quality value exceeding the first quality threshold.

14. The method according to claim 13, wherein:
the beam recovery signaling further includes information on the quality value of each candidate beam.

15. The method according to claim 12, further comprising:
receiving, from the network entity, a second threshold value for a candidate beam to be used for the beam failure recovery, and
determining whether a quality value of the at least one candidate beam for the beam failure recovery exceeds the second quality threshold.

16. The method according to claim 15, wherein:
if it is determined that there is no candidate beam associated with CFRA signal having a quality value exceeding the first quality threshold and that there is at least one candidate beam having a quality value exceeding the first or second quality threshold,
the beam recovery signaling is transmitted to the network entity using a medium access control element, MAC CE, and includes a predetermined number of the at least one or more of the plurality of candidate beams having a quality value exceeding the second quality threshold in descending order of the quality value.

17. The method according to claim 15, wherein:
if it is determined that there is no candidate beam having a quality value exceeding the first and second quality threshold,
the beam recovery signaling in the MAC CE includes information on one candidate beam having the highest quality value among the detected candidate beams.

18. The method according to claim 15, wherein:
if it is determined that there is no candidate beam having a quality value exceeding the first and second quality threshold,
the user equipment indicates to the network entity that no candidate is available.

19. The method according to claim 15, wherein:
if it is determined that there is one candidate beam existing on the first serving cell,
the beam recovery signaling includes the one candidate beam, wherein
the beam recovery signaling optionally includes information whether or not the candidate beam exceeds the first and second quality threshold, and
the quality value of the candidate beam is optionally signaled in a separate transmission to the network entity.

20. An apparatus, comprising:
at least one processor, and
at least one memory including computer program code,
the at least one memory and the computer program code configured to, with the at least one processor, cause the apparatus at least to:
compose, after a beam failure has been detected by a user equipment on a resource provided by a first serving cell of the user equipment, beam recovery signaling, the beam recovery signaling indicating at least one candidate beam to be used in beam failure recovery,
transmit, to a network entity, the beam recovery signaling on a resource provided by a second serving cell;
detect at least one candidate beam existing on the resource provided by the first serving cell,
receive, from the network entity, a first quality threshold for a candidate beam to be used for the beam failure recovery,
determine whether a quality value of the at least one candidate beam for the beam failure recovery exceeds the first quality threshold,
receive, from the network entity, a second threshold value for a candidate beam to be used for the beam failure recovery, and
determine whether a quality value of the at least one candidate beam for the beam failure recovery exceeds the second quality threshold.

21. The apparatus according to claim 20, wherein:
if it is determined that there is at least one candidate beam associated with contention free random access, CFRA, signal and having a quality value exceeding the first quality threshold,
the at least one memory and computer program code are configured, with the at least one processor, to cause the apparatus to transmit the beam recovery signaling to the network entity using contention free random access transmission to indicate at least one of candidates having quality value exceeding the first quality threshold.

22. The apparatus according to claim 20, wherein:
if it is determined that there is no candidate beam associated with CFRA signal having a quality value exceeding the first quality threshold and that there is at least one candidate beam having a quality value exceeding the first or second quality threshold,
the beam recovery signaling is transmitted to the network entity using a medium access control element, MAC CE, and includes a predetermined number of the at least one or more of the plurality of candidate beams having a quality value exceeding the second quality threshold in descending order of the quality value.

23. The apparatus according to claim 20, wherein:
if it is determined that there is no candidate beam having a quality value exceeding the first and second quality threshold,
the beam recovery signaling in the MAC CE includes information on one candidate beam having the highest quality value among the detected candidate beams.

24. The apparatus according to claim 20, wherein:
if it is determined that there is no candidate beam having a quality value exceeding the first and second quality threshold,
the user equipment indicates to the network entity that no candidate is available.

25. The apparatus according to claim 20, wherein:
if it is determined that there is one candidate beam existing on the first serving cell,
the beam recovery signaling includes the one candidate beam, wherein
the beam recovery signaling optionally includes information whether or not the candidate beam exceeds the first and second quality threshold, and
the quality value of the candidate beam is optionally signaled in a separate transmission to the network entity.

* * * * *